US011764875B2

United States Patent
Foursa et al.

(10) Patent No.: US 11,764,875 B2
(45) Date of Patent: Sep. 19, 2023

(54) GAIN EQUALIZATION ERROR MANAGEMENT IN OPTICAL COMMUNICATION SYSTEMS

(71) Applicant: SUBCOM, LLC, Eatontown, NJ (US)

(72) Inventors: Dmitri G. Foursa, Colts Neck, NJ (US); Timothy E. Hammon, Stratham, NH (US)

(73) Assignee: SUBCOM, LLC, Eatontown, NJ (US)

( * ) Notice: Subject to any disclaimer, the term of this patent is extended or adjusted under 35 U.S.C. 154(b) by 303 days.

(21) Appl. No.: 17/091,322

(22) Filed: Nov. 6, 2020

(65) Prior Publication Data
US 2022/0149944 A1    May 12, 2022

(51) Int. Cl.
*H04B 10/294* (2013.01)
*H01S 3/067* (2006.01)

(52) U.S. Cl.
CPC ..... *H04B 10/2941* (2013.01); *H01S 3/06754* (2013.01); *H01S 2301/04* (2013.01)

(58) Field of Classification Search
CPC .................................................. H01S 2301/04
See application file for complete search history.

(56) References Cited

U.S. PATENT DOCUMENTS

| | | | |
|---|---|---|---|
| 5,568,310 A | 10/1996 | Naito | |
| 6,034,812 A * | 3/2000 | Naito | H01S 3/067 398/1 |
| 6,137,605 A | 10/2000 | Watanabe | |
| 6,219,176 B1 | 4/2001 | Terahara | |
| 6,344,914 B1 * | 2/2002 | Shimojoh | H04J 14/0221 398/20 |
| 6,353,497 B1 * | 3/2002 | Zhang | H01S 3/10023 359/341.1 |
| 6,473,549 B1 * | 10/2002 | Park | H01S 3/10023 359/341.1 |
| 2002/0071173 A1 * | 6/2002 | Lee | H01S 3/1301 359/337.1 |
| 2002/0154387 A1 * | 10/2002 | Mori | G02B 5/288 359/337.1 |

(Continued)

FOREIGN PATENT DOCUMENTS

EP    0810699 B1    3/2002

OTHER PUBLICATIONS

International Search Report and Written Opinion dated Dec. 9, 2021, for the International Patent Application No. PCT/US2021/049423, filed on Sep. 8, 2021, 9 pages.

*Primary Examiner* — Eric L Bolda
(74) *Attorney, Agent, or Firm* — KDW Firm PLLC

(57) ABSTRACT

Techniques for managing gain equalization error in optical communication systems are provided. For example, a multi-stage gain correction filter may be configured to at least correct gain equalization error produced by filters with insufficient resolution, for example, conventional non-reflective gain correction technology used in the optical communication systems. The multi-stage filter may include at least a broadband gain correction filter to correct gain equalization error in most of the transmission bandwidth and a narrow band gain correction filter to correction error in a narrow region of the bandwidth. One or more of the multi-stage filters may be implemented in the repeaters of the system (which may be referred to as hybrid GFFs) or may be included in a standalone body (which may be referred to as hybrid GEFs).

20 Claims, 10 Drawing Sheets

(56) References Cited

U.S. PATENT DOCUMENTS

| | | | |
|---|---|---|---|
| 2004/0114216 A1* | 6/2004 | Huang | H01S 3/06754 359/341.41 |
| 2004/0169926 A1 | 9/2004 | Blair et al. | |
| 2005/0248832 A1* | 11/2005 | Sommer | H04B 10/2941 359/337 |
| 2006/0268394 A1* | 11/2006 | Sommer | H01S 3/06754 359/337.5 |
| 2017/0063467 A1 | 3/2017 | Pilipetskii et al. | |
| 2020/0235816 A1* | 7/2020 | Zhang | H04B 10/2912 |

\* cited by examiner

300

GAIN EQUALIZATION ERROR MANAGEMENT IN OPTICAL COMMUNICATION SYSTEMS

BACKGROUND OF THE INVENTION

Field of the Invention

Embodiments of the present disclosure relate to the field of optical communication systems. More particularly, the present disclosure relates to at least techniques for managing gain equalization error in optical communication systems.

Discussion of Related Art

Long-haul optical communication systems, such as submarine optical communication systems, generally suffer from signal attenuation resulting from a variety of factors, including scattering, absorption, and bending. To compensate for attenuation, these long-distance systems may include a series of optical amplifiers that are spaced along a signal transmission path and configured to amplify or boost the optical signal in a manner that allows reliable detection at a receiver. Depending on the length of the transmission path, the number of optical amplifiers positioned along the path (and lengths therebetween) may vary.

A commonly used optical amplifier in long-haul optical communication systems may be the erbium-doped fiber amplifier (EDFA), which includes an optical fiber doped with erbium (a rare earth element) that can be stimulated by laser (e.g., 980 nm wavelength region, 1480 nm wavelength region) to boost the intensity of certain wavelengths of an incoming optical signal. EDFAs are known to output wavelength-dependent gain. Thus, when an optical signal, such as a wavelength division multiplexed (WDM) optical signal having a plurality of optical channels is amplified by an EDFA, some wavelengths within the WDM signal wavelengths may be amplified more than others.

To reconcile inconsistencies in wavelength amplification, a gain-flattening filter (GFF) or a gain equalizing filter (GEF) may be used to restore or correct wavelengths in the optical signal to approximately the same or specifically designed intensity, which is generally known or referred to as gain equalization or gain flattening. However, achieving sustained equalization accuracy when correcting gain in long haul optical communication systems may be both challenging and demanding. For example, GFFs that are used in repeaters may have limited accuracy or resolution, and thus, accumulated gain-related error may get cleaned up periodically via GEFs (typically arranged in separate GEF bodies) to keep the overall gain distortions in the system within predefined design limits.

GFFs or GEFs may utilize various gain correction technologies, including but not limited to short period Bragg grating filters (SP-BGFs), slanted Bragg grating filters (S-BGFs), long period grating filters (LP-GFs), and thin film filters (TFFs). Generally, non-reflective filters, such as S-BGFs, LP-GFs, and TFFs, that exhibit or have little to no back-reflection do not require an extra isolator at the GFF output of the EDFA (see FIG. 10A). However, reflective filters, such as SP-BFGs, do require an extra isolator at the GFF output (see FIG. 10B). This isolator adds undesired loss to the propagated optical signal. Thus, non-reflective GFFs or GEFs provide a design advantage at both the component and system levels since reducing the overall number of passive components, such as optical isolators, potentially reduces loss and improves cost and power efficiency in the design.

One drawback of using non-reflective GFFs or GEFs, however, is that the resolution of non-reflective filters is typically worse than the resolution of reflective filters. As a result, the gain error produced by non-reflective filters have gain shape variations that may be too drastic or too fast for a clean-up filter to effectively remedy, which may produce gain variations significantly exceeding design limits at the receiver.

SUMMARY OF THE INVENTION

Techniques for managing gain equalization error in optical communication systems are provided. For example, a multi-stage gain correction filter may be configured to at least correct gain equalization error produced by conventional non-reflective gain correction technology used in the optical communication systems. The multi-stage filter may include at least a broadband gain correction filter to correct gain equalization error in most of the transmission bandwidth and a narrow band gain correction filter to correction error in a narrow region of the bandwidth. One or more of the multi-stage filters may be implemented in the repeaters of the system (which may be referred to as hybrid GFFs) or may be included in a standalone body (which may be referred to as hybrid GEFs).

In one embodiment, a gain correction filter may include at least a first filter and a second filter different from the first filter. For example, the first filter may be configured to correct gain equalization error in a first portion of an optical transmission bandwidth and the second filter may be configured to correct gain equalization error in a second portion of the optical transmission bandwidth, where the first portion of the optical transmission bandwidth may be broader than the second portion. The first and the second corrective filters can have characteristics that are complimentary in the entire transmission bandwidth.

In another embodiment, a method may include at least correcting, via a first filter, gain equalization error in a first portion of an optical transmission bandwidth and correcting, via a second filter, gain equalization error in a second portion of the optical transmission bandwidth. For example, the first filter may be different from the second filter and the first portion of the optical transmission bandwidth may be broader than the second portion.

In yet another embodiment, a system may include at least one repeater arranged and spaced along an optical fiber cable, where the at least one repeater may include a plurality of erbium doped fiber amplifiers (EDFAs) and may further include a plurality of hybrid gain correction filters, each hybrid gain correction filter coupled to an output of each EDFA of the at least one repeater. For example, each hybrid gain correction filter may include at least a first filter and a second filter different from the first filter, where the first filter may be configured to correct gain equalization error in a first portion of an optical transmission bandwidth and the second filter may be configured to correct gain equalization error in a second portion of the optical transmission bandwidth. The first portion of the optical transmission bandwidth may be broader than the second portion.

DESCRIPTION OF EMBODIMENTS

Figure 1:
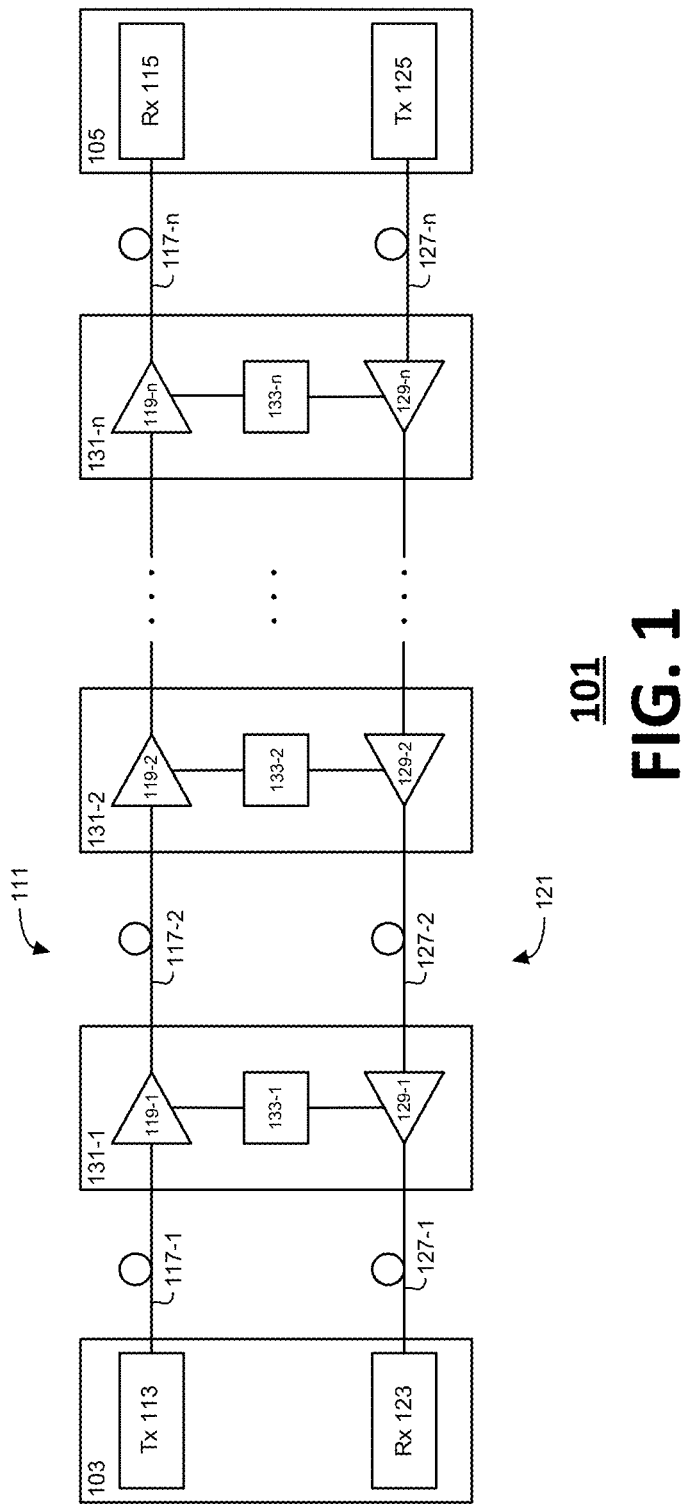
FIG. 1 illustrates an example optical communication system.

The present invention is directed to techniques for managing, correcting, or otherwise reconciling unwanted gain equalization error in optical communication systems that use or implement at least conventional non-reflective gain flattening or equalization technology. According to embodiments, a multi-stage filter (which may be referred to herein as a "hybrid" filter, hybrid GFF, or hybrid GEF) may combine at least broadband and narrowband filtering capabilities to correct or substantially smooth out any undesirable variations in gain shape. For example, the multi-stage filter may include at least two different filters: a broadband gain correction filter configured to at least cover and correct gain on an entire (or nearly the entire) optical transmission bandwidth and a narrow band gain correction filter configured to isolate and correct gain on a narrow range of the transmission bandwidth. As will be further described in detail below, unwanted gain variations caused by at least the use of conventional non-reflective gain flattening or equalization technology may exhibit elevated slopes (e.g., expressed in dB/nm) and may typically occur at opposed regions of the optical transmission bandwidth.

In embodiments, each of the filters of the multi-stage filter may be arranged in different ways: the broadband filter first followed by the narrow band filter or vice versa. Moreover, each of the filters of the multi-stage filter may be based on at least non-reflective or reflective filter technology. For example, the broadband filter may be based on reflective technology, which may require an isolator arranged between the broadband filter and the narrowband filter so as to mitigate interference from back-reflection. In another example, both the broadband and narrow band filters may be based on non-reflective technology, which would not require any isolators arranged therebetween.

Moreover, it may be understood that two or more filter stages of the multi-stage filter may be combined in a single package for at least space and assembly cost saving purposes (e.g., two or more TFFs may be effectively placed or arranged in one enclosure). It may further be understood that the one or more filters of the multi-stage filter may be chirped or non-chirped, where the chirp, for example, may be uniform or variable across the bandwidth.

In further embodiments, one or more of the multi-stage filters may be arranged or configured in an optical communication system in various ways. For example, a multi-stage filter may be arranged at the output of each respective EDFA of a repeater. In another example, the one or more multi-stage filters may be arranged in a standalone GEF body, where the entire GEF body may be coupled to every "N" repeater, where N is predetermined or predefined, such that each multi-stage filter of the GEF body is coupled to each EDFA output of the repeater. For ease of explanation herein, the multi-stage filters arranged in the repeater may be referred to as hybrid GFFs and the multi-stage filters arranged in the GEF body may be referred to as hybrid GEFs.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Referring to the drawings, FIG. 1 illustrates an exemplary bi-directional optical communication system 101 which may use high-bandwidth fiber optics to transmit vast amounts of data over long distances. Bi-directional data transmission may be implemented by constructing pairs of optical fibers within the optical cable and transmitting one or more channels, e.g., wavelength division multiplexed channels, per fiber pair.

As shown, the optical communication system 101 may include terminals 103 and 105 connected by two unidirectional optical paths 111, 121, which together form a bi-directional optical fiber pair. Optical path 111 may transmit information in one direction (e.g., to the right) from a transmitter 113 at terminal 103 to a receiver 115 at terminal 105. Optical path 121 may transmit information in the other direction (e.g., to the left) from a transmitter 125 at terminal 105 to a receiver 123 at terminal 103. With respect to terminal 103, the optical path 111 is an outbound path and the optical path 121 is an inbound path. The optical path 111 may include optical fibers 117-1 to 117-$n$ and optical amplifiers 119-1 to 119-$n$, and the optical path 121 may include optical fibers 127-1 to 127-$n$ and optical amplifiers 129-1 to 129-$n$. The one or more of the optical amplifiers 119-1 to 119-$n$ and 129-1 to 129-$n$ may be EDFAs. It may be understood that, in some examples, transmitter 113 and receiver 123 may be housed together as a transponder at terminal 103, and similarly, transmitter 115 and receiver 125 may also be housed together as a transponder at terminal 105.

The optical path pair (e.g., optical paths 111, 121) may be configured as a set of amplifier pairs 119-1 to 119-$n$ and 129-1 to 129-$n$ within repeaters 131-1 to 131-$n$ connected by pairs of optical fibers 117-1 to 117-$n$ and 127-1 to 127-$n$, which may be included in an optical fiber cable together with fibers supporting additional path pairs. Each repeater 131 may include a pair of amplifiers 119, 129 for each path pair and may include additional amplifiers for additional path pairs. The optical amplifiers 119, 129 may utilize EDFAs or other rare earth doped fiber amplifiers, e.g., Raman amplifiers, semiconductor optical amplifiers (SOAs). A coupling path 133-1 to 133-$n$ may be coupled between optical paths 111, 121, for example, in one or more of the repeaters 131-1 to 131-$n$. It may be understood that the term "couple" or "coupled," as used herein, broadly refers to any connection, connecting, coupling, link, or linking, either a direct or indirect or a wired or wireless connection and does not necessarily imply that the coupled components or elements are directly connected to each other.

Although an exemplary embodiment of the optical communication system 101 is shown and described, variations of the optical communication system 101 are within the scope of the present disclosure. The optical communication system 101 may include, for example, more optical path pairs and more or fewer repeaters. Alternatively, the optical communication system 101 may not include any optical amplifiers or may include, instead of optical amplifiers, optical pump power sources suitable for implementing optical gain by Raman amplification within optical fibers connecting repeaters, or within optical fibers contained within one or more repeaters 131.

Moreover, it may be understood that the transmitters, receivers, transponders containing the transmitters and receivers, or any other suitable device for transmitting and receiving data, may be include at least one memory and one or more processors (e.g., CPU, ASIC, FGPA, any conventional processor, etc.) to execute instructions stored in memory.

Figure 2:
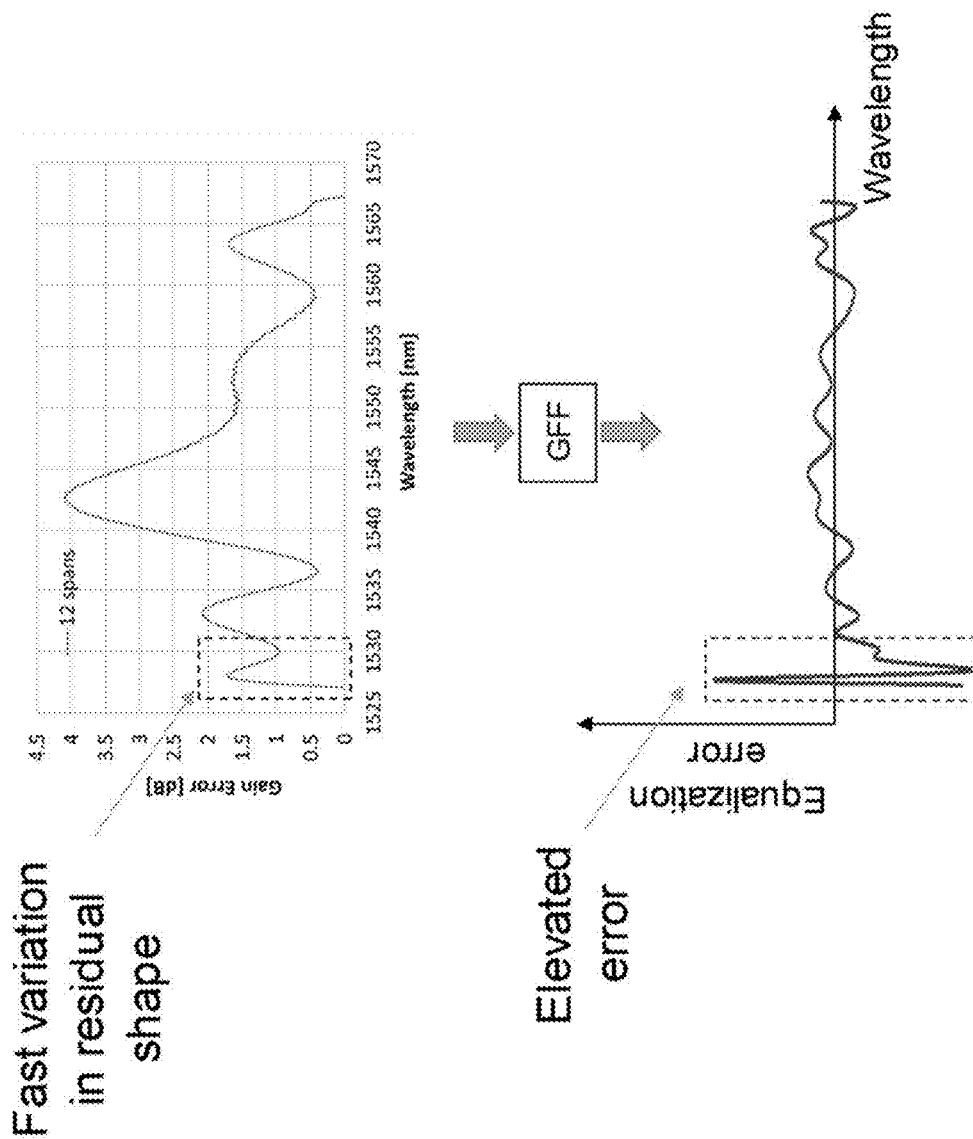
FIG. 2 illustrates an example of elevated gain equalization error.

FIG. 2 illustrates an example of elevated gain equalization error 200 produced by a conventional, non-reflective gain correction filter (e.g., GFF, GEF) according to embodiments. For ease of explanation, the example is based on accumulated gain equalization error after twelve repeaters (e.g., twelve spans). As shown in the top plot, the gain error (e.g., in dB) has a rapid or relatively drastic variation between the 1525 nm and 1530 nm wavelengths, as outlined by the dashed box. It may be understood that this variation in the residual shape of the gain error may get more drastic as the optical signal is amplified over a span of more repeaters.

When the amplified optical signal is passed through a conventional, non-reflective gain correction filter (which may be a GFF if arranged in a repeater or a GEF if arranged in a separate GEF body) after twelve repeaters, the equalization error output by the conventional filter may be elevated at one or more opposed sides or extreme regions of the optical bandwidth. There could be system design cases using reflective gain correction filter resulting in an elevated equalization error as well. For example, as shown in the bottom plot, the gain equalization error is significantly elevated on the left-hand side of the bandwidth, as outlined by the dashed box. As described above, error, such as the illustrated elevated gain equalization error, may propagate through the optical communication system and may produce gain variations significantly exceeding design limits associated with the system receiver(s).

Figure 3:
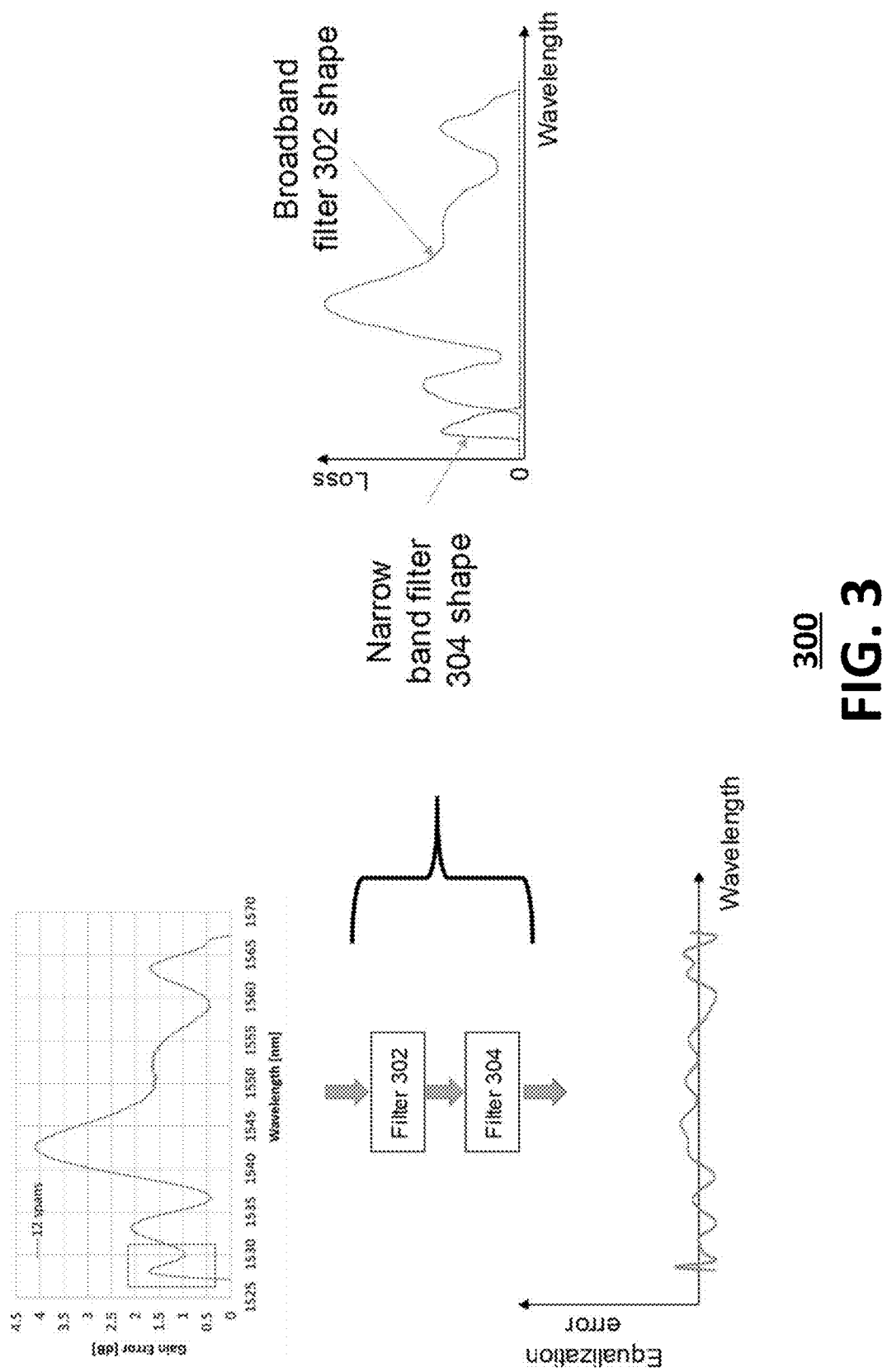
FIG. 3 illustrates an example of gain equalization using a hybrid filter.

FIG. 3 illustrates an example of gain equalization 300 using a hybrid gain correction filter according to embodiments. For ease of explanation, the gain equalization error accumulated over the twelve repeaters described above with respect to FIG. 2 will be used to describe the hybrid gain equalization 300 of FIG. 3.

As shown, the hybrid gain correction filter may be a multi-stage filter and may include at least filters 302 and 304. For example, filter 302 may be a broadband gain correction filter (which may simply be referred to herein as a broadband filter) and filter 304 may be a narrow band gain correction filter (which may be referred to as a narrow band filter). The broadband filter 302 may correct or equalize variations in the gain shape (e.g., gain shape error) in most, if not all, of the bandwidth, which is illustrated by the solid line in the plot on the right-hand side (the broad band filter 302 shape). Thus, the output of the broadband filter 302 may exhibit an equalization error shape having an essentially flat, low peak-to-peak variation in most or all of the transmission bandwidth.

In further examples, the narrow band filter 304 may correct or equalize variations in the gain shape (e.g., gain shape error) in a narrow region of the bandwidth, as shown by the dashed line in the plot on the righthand side (the narrow band filter 304 shape). The narrow region may be a predetermined or predefined bandwidth range, which may be based on system and/or component design. The output of the narrow band filter 304 may also exhibit an equalization error shape having an essentially flat, low peak-to-peak variation in the narrow bandwidth region. Accordingly, the shape of the equalization error of the optical signal produced by the broadband and narrow band filters 302 and 304 of the hybrid gain correction filter, together, may be substantially smooth and leveled out, as shown in the bottom left plot (e.g., the elevated gain equalization error in the bottom plot of FIG. 2 has been removed).

It may be understood that the broadband pass filter may be any type of broadband optical filter having gain correction technology configured to at least correct or equalize gain shape and variations thereof in most or all of the transmission bandwidth. The narrow band filter may be understood to be any type of narrow band optical filter having gain correction technology configured to at least correct or equalize gain shape and variations thereof in a narrow region of the transmission bandwidth. It may further be understood that the hybrid gain correction filter illustrated in FIG. 3 may be a hybrid GFF arranged in a repeater or may be a hybrid GEF arranged in a separate GEF body, as will be further described in detail below. Moreover, various arrangements of the filters 302 and 304 of the hybrid filter may be contemplated, for example, the narrow band filter 304 may be arranged first and then the broadband filter 302 may follow, or in examples, more than two filters may be included in the hybrid gain correction filter (e.g., the number of filters and types depending on system design objectives, constraints, or the like).

Figure 4:
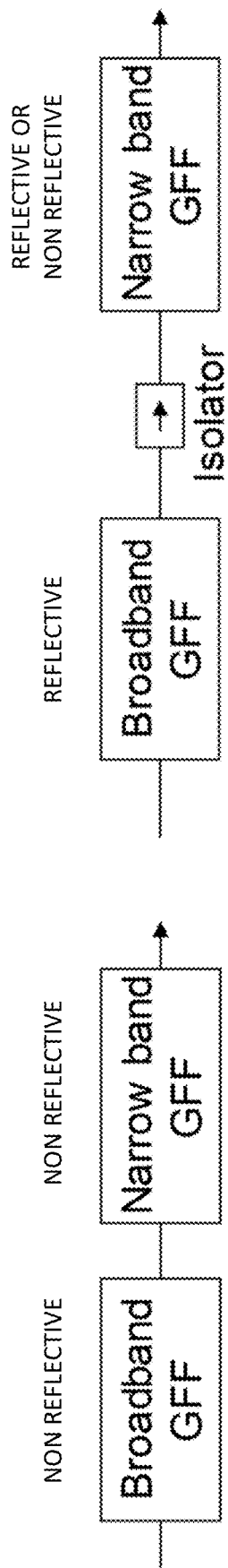
FIG. 4A illustrates a first example hybrid filter.
FIG. 4B illustrates a second example hybrid filter.

FIG. 4A and FIG. 4B illustrate different examples of hybrid gain correction filters 402 and 404 and the different technologies that can be implemented therein according to embodiments. As shown in FIG. 4A, for example, the hybrid gain correction filter 402 may include at least a broadband GFF and a narrow band GFF, both of which may be based on non-reflective technology, as shown (e.g., both the broadband and narrow band GFFs are non-reflective filters). Since each stage of the hybrid filter 402 employs non-reflective technology, it may be understood that no other additional components, such as an isolator, is required to be arranged or coupled either between the stages or after the second stage.

In another example, as shown in FIG. 4B, the hybrid gain correction filter 404 may also include a broadband GFF and a narrow band GFF. However, the broadband GFF may be based on reflective technology (e.g., the broadband GFF is a reflective filter) and the narrow band GFF may be based on either reflective or non-reflective technology (e.g., the narrow band GFF may be either a reflective or non-reflective filter). And since the broadband GFF of the hybrid gain correction filter 404 is based on reflective technology, at least one isolator may be arranged or coupled between the broadband and narrow band GFFs so as to account for and substantially neutralize any back-reflection or interference caused by the reflective properties of the broadband GFF. Additional isolators can also be added downstream or upstream of the hybrid filter if necessary.

While GFFs are used and shown in the hybrid gain correction filters 402 and 404, it may be understood that the broadband and narrow band filters of the filters 402 and 404 may be GEFs. Further, as set forth above, the arrangement, order, quantity, etc. of the filter stages may vary at least depending on system or component design, e.g., the reflective broadband GFF of hybrid filter 404 may be arranged after the narrow band GFF. Moreover, it may be understood that the one or more stages of the hybrid filters can be combined in a single package for space and assembly cost saving purposes, for example, two or more TFFs may be placed in one enclosure, housing, packaging, etc. It may further be understood that the hybrid filters and/or aspects thereof may be chirped or non-chirped, for example, the chirp can be configured to be uniform or variable across the transmission bandwidth.

Figure 5:
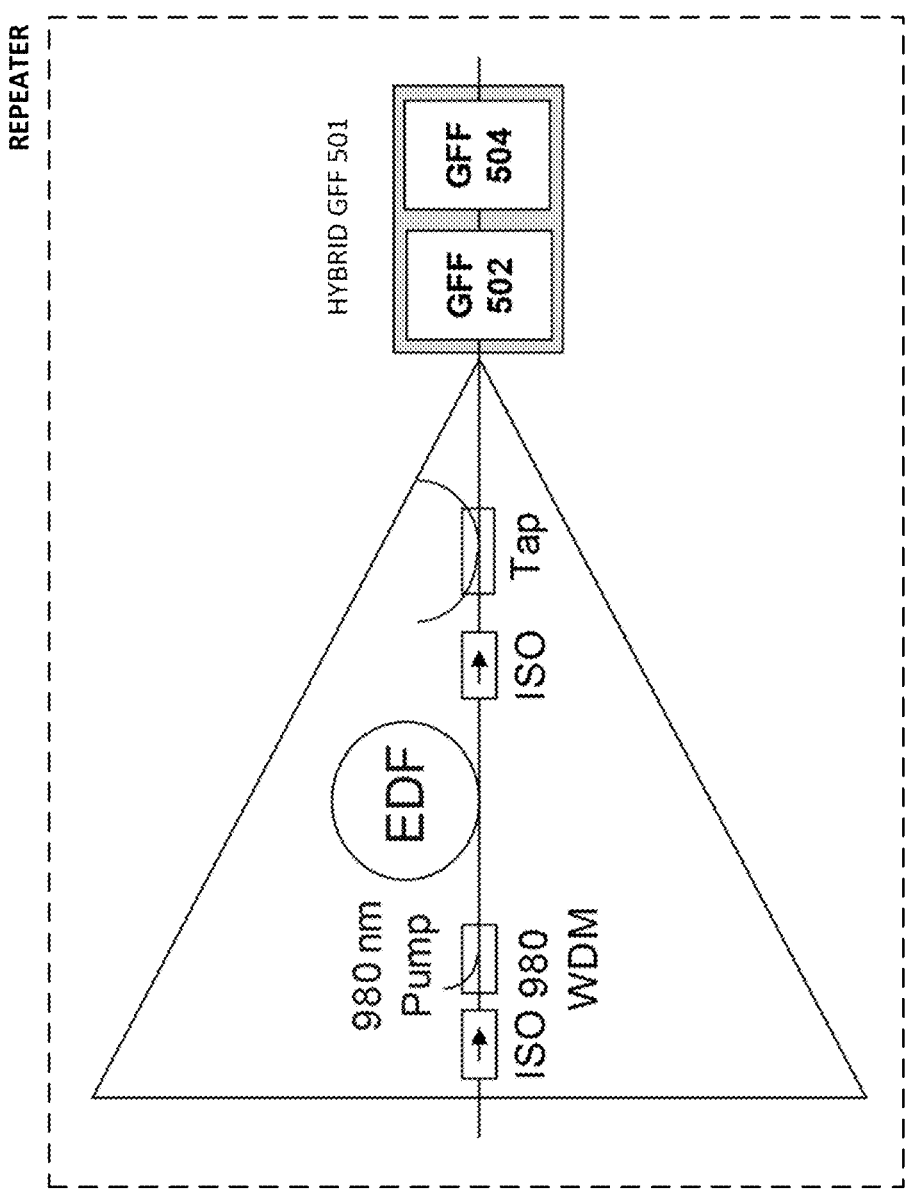
FIG. 5 illustrates an example hybrid GFF arranged in a repeater.

FIG. 5 illustrates an example hybrid GFF 501 arranged in a repeater according to embodiments. For example, the repeater, which is outlined by the dashed box, may include (e.g., physically house or enclose) a plurality of EDFAs, such as the one illustrated in FIG. 5. The EDFA may include various internal components, such as an erbium doped fiber, isolator(s), tap(s), etc.

As shown, a hybrid GFF 501, may be arranged at and/or coupled to the output of the EDFA in the repeater. The hybrid GFF 501 may include at least GFF 502, which may be a broadband GFF, and GFF 504, which may be a narrow band GFF, as described above. Similar hybrid GFFs may be arranged at and/or coupled to the output of other additional EDFAs in the repeater. As will be further described in detail below, hybrid GFFs, such as hybrid GFF 501, may be arranged in every "Nth" repeater, where N is a predetermined or predefined number that is selected based on at least system or component design. Accordingly, the hybrid GFF 501 may correct or equalize the shape of gain that has been accumulated over N spans. A hybrid GFF 501 can be coupled to the input of the amplifier, placed between the stages of multistage amplifier or placed within the active fiber, such as the Erbium-doped fiber, with pump bypass or without. It can also be used in any other arrangement and placement in broadband amplifiers, like C+L band EDFA, that includes separate C- and L-band EDFA sections.

Figure 6:
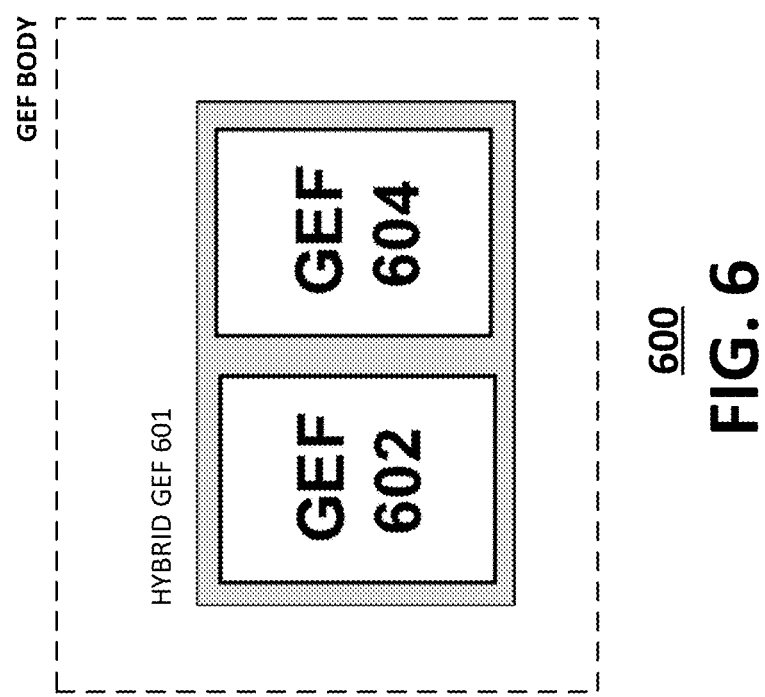
FIG. 6 illustrates an example hybrid GEF arranged in a GEF body.

FIG. 6 illustrates an example hybrid GEF 601 arranged in a GEF body according to embodiments. For example, the GEF body may be a separate and standalone physical component that includes or houses a plurality of hybrid GEFs (including hybrid GEF 601). Thus, the GEF body may be separate from a repeater. It may be understood that the number of GEFs arranged or configured in the GEF body may vary and depend on the number of EDFAs in a repeater (e.g., the number of fibers in the optical communication system).

As illustrated, similar to the hybrid GFF 501 of FIG. 5, the hybrid GEF 601 may include at least GFF 602, which may be a broadband GEF, and GFF 604, which may be a narrow band GEF. In examples, the GEF body may be coupled to a repeater such that each of the hybrid GEFs in the GEF body is coupled or connected to each of the EDFA output of the repeater. In at least that regard, the hybrid GEFs in the GEF body effectively operate like the hybrid GFFs except the GEFs, for example, are at least external to the repeater. Thus, advantageously, hybrid GEFs and corresponding GEF bodies allow design flexibility in and gain correction at strategic places in optical communication systems, especially in legacy systems having repeaters that are not easily configurable or modifiable with hybrid GFFs.

In addition to the above described embodiments and examples, more complex gain correction arrangements may be contemplated. For example, the narrow band filter may be configured to correct the gain shape in multiple locations across the optical transmission bandwidth where the broadband filter is applied. Moreover, the broadband filter may be designed to cover the entire transmission bandwidth. Further, various configurations of the hybrid gain correction filters are also contemplated. For example, hybrid gain correction can be applied periodically (e.g., every 12 repeaters) either in the repeater itself or in a separate body designed to be coupled to the repeaters, as will be further described below.

Figure 7:
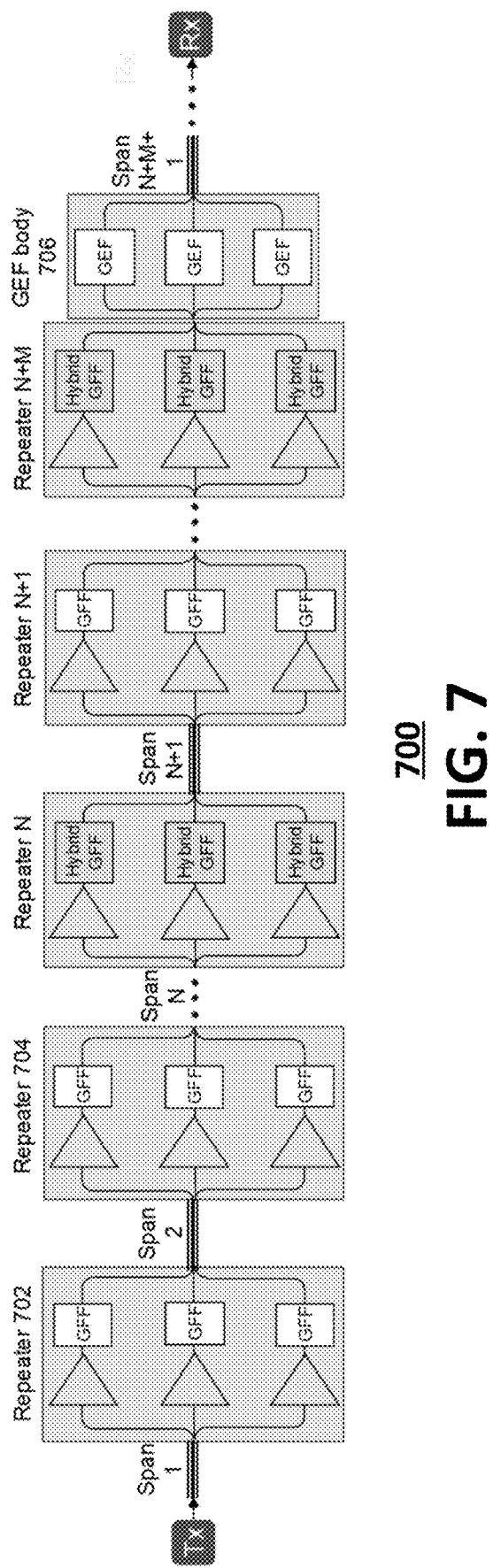
FIG. 7 illustrates an example hybrid GFF implementation.

FIG. 7 illustrates an example hybrid GFF implementation 700 in an optical communication system according to embodiments. For example, FIG. 7 shows a unidirectional portion of the optical communication system having at least three separate optical fibers coupled or connected between a transmitter (Tx) and a receiver (Rx). Repeaters 702, 704, N, N+1, N+M may be arranged and spaced out at predetermined distances, intervals, or spans between the transmitter and receiver for amplifying the optical signals transmitted on each of the three optical fibers. As shown, each of the repeaters (except for repeaters N and N+M) may include at least three EDFAs and at least three conventional GFFs coupled at the output of the EDFAs corresponding to each of the optical fibers. Each of the repeaters N and N+M also include at least three EDFAs, but instead of conventional GFFs, three hybrid GFFs may be coupled to the respective EDFA outputs, as illustrated. Also shown in FIG. 7 is a conventional GEF body 706 (containing at least three conventional GEFs) that may be coupled to repeater N+M. In general, it may be understood that the minimum number of amplifiers in the repeater for one transmission direction is equal or greater than one.

As described above, the hybrid GFFs of repeaters N and N+M may be configured to correct or equalize any variations or error in gain shape accumulated over a plurality of repeater spans. In embodiments, the spacing of the hybrid GFFs may be predetermined based at least in part on optimal gain correction capability and/or system design. For example, the optimal hybrid GFF spacing may be the distance between repeater N and repeater N+M (e.g., after "Mth" repeater or a repeater span of M). It is understood that this distance can be greater or less than M.

Figure 8:
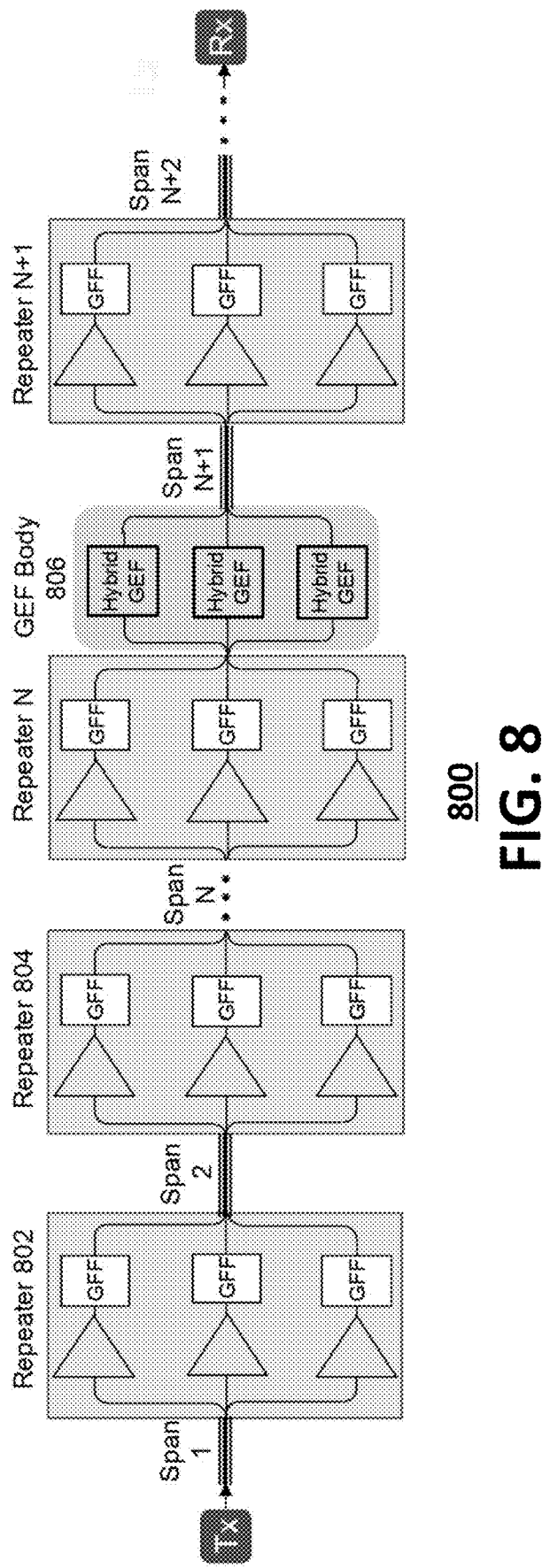
FIG. 8 illustrates a first example hybrid GEF implementation.

FIG. 8 illustrates an example hybrid GEF implementation 800 in an optical communication system according to embodiments. The optical communication system of FIG. 8 may be similar to the system illustrated in FIG. 7 in that at least a unidirectional portion of the system has three separate optical fibers between a transmitter and receiving and further includes repeaters 802, 804, N, and N+1, each having three EDFAs and three conventional GFFs corresponding to a respective optical fiber.

As shown, a hybrid GEF body 806 may include at least three hybrid GEFs and the GEF body 806 may be coupled to repeater N so as to at least correct or equalize accumulated gain shape variation or error, as described above. Each of the GFF outputs in repeater N are coupled to a respective hybrid GEF of GEF body 806. One of the many advantages of utilizing a hybrid GEFs is that they may provide installation or configuration flexibility, which allows easy integration of hybrid gain correction filters into an existing system environment, such as legacy systems that cannot be easily modified.

Figure 9:
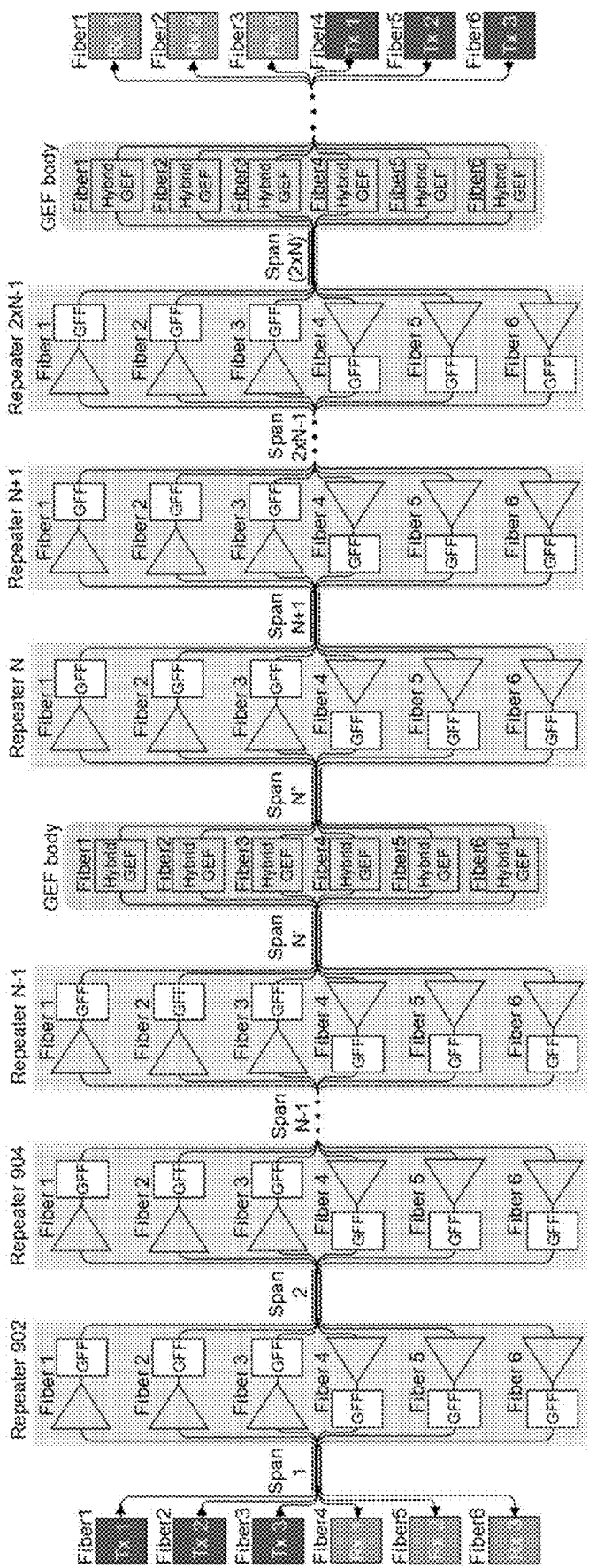
FIG. 9 illustrates a second example hybrid GEF implementation.
Figure 10B:
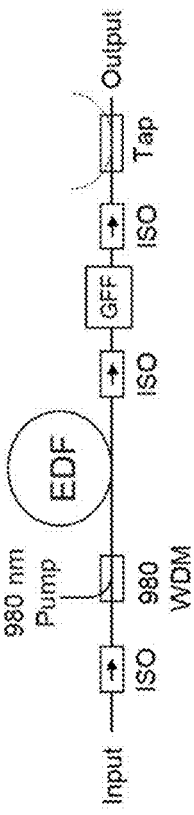
FIG. 10B illustrates an EDFA with a reflective GFF.
Figure 10A:
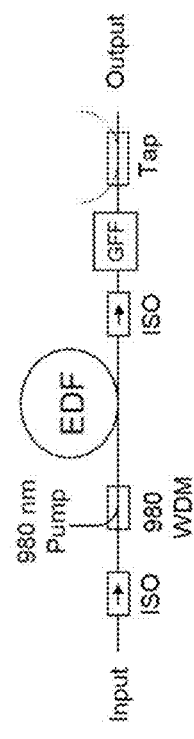
FIG. 10A illustrates an EDFA with a non-reflective GFF.

FIG. 9 illustrates an example bidirectional hybrid GEF implementation 900 in an optical communication system according to embodiments. The optical communication system of FIG. 9 may be similar to the system illustrated in FIG. 8, except that the system is bidirectional. Similar to GEF body 806, one or more GEF bodies having hybrid GEFs may be coupled to one or more repeaters of the system, as shown. Since the communication system is bidirectional, the two illustrated GEF bodies have at least six separate hybrid GEFs, three of which correspond to the three fibers in one direction and the remaining three corresponding to the three fibers in the opposite direction.

It may be understood that, in some examples, both hybrid GFF and hybrid GEF implementations are possible in the same communication system to further improve gain equalization error correction capabilities. For example, hybrid GFFs may be included in every Nth repeater while GEF bodies having hybrid GEFs may be coupled to every Mth repeater and so on.

The above-described multi-stage gain correction filter is advantageous in numerous ways. As set forth above, the use of conventional non-reflective gain correction technology in repeaters (or conventional GEF bodies) of an optical communication system may be important because it may reduce the overall number of passive components, e.g., isolators, in the repeaters, which may ultimately improve power performance of the system and save various system-related costs. Thus, the above-described hybrid gain correction filters (e.g., hybrid GFF, hybrid GEF) correct any unwanted variations in gain shape (e.g., gain equalization error) generated by the conventional non-reflective gain correction filters in the system. This advantageously allows the continued use of conventional non-reflective gain correction technology in the optical communication system without the negative and unwanted effects of gain equalization error being propagated through the system. Moreover, the stages of the hybrid GFFs or GEFs may be arranged in different ways and various types of technology (e.g., reflective, non-reflective) may be implemented therein. Hybrid GEF(s) or GFF(s) may also be advantageous in cases with amplifier gain-shapes, where nonhybrid filter use (either based on reflective or nonreflective technologies) results in elevated gain equalization error at the receiver.

Herein, novel and inventive techniques for managing gain equalization error in optical communication systems that use or implement conventional gain correction technology are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A hybrid gain correction filter used in combination with an optical amplifier comprising:
    a first filter; and
    a second filter different from the first filter,
    wherein the first filter is configured to correct gain equalization error in a first portion of an optical transmission bandwidth,
    wherein the second filter is configured to correct gain equalization error in a second portion of the optical transmission bandwidth,
    wherein the first portion of the optical transmission bandwidth is broader than the second portion, and
    wherein the hybrid gain correction filter is tailored to correct variations in gain shape generated by a gain correction filter coupled to an output of the optical amplifier.

2. The hybrid gain correction filter of claim 1, wherein the first filter is a broadband gain correction filter and wherein the first portion is a majority or all of the optical transmission bandwidth.

3. The hybrid gain correction filter of claim 2, wherein the second filter is a narrow band gain correction filter and wherein the second portion is a narrow region of the optical transmission bandwidth.

4. The hybrid gain correction filter of claim 3, wherein the gain correction filter is arranged in a repeater and the broadband and narrow band gain correction filters are gain flattening filters (GFFs).

5. The hybrid gain correction filter of claim 3, wherein the gain correction filter is arranged in a standalone body and the broadband and narrow band gain correction filters are gain equalization filters (GEFs).

6. The hybrid gain correction filter of claim 1, wherein the first filter is a reflective or non-reflective filter.

7. The hybrid gain correction filter of claim 6, wherein at least one isolator is arranged between the first and second filters if the first filter is the reflective filter.

8. A method comprising:
    correcting, via a first filter, gain equalization error in a first portion of an optical transmission bandwidth for an optical signal, the optical signal being output from a gain correction filter coupled to an optical amplifier; and
    correcting, via a second filter, gain equalization error in a second portion of the optical transmission bandwidth for the optical signal,
    wherein the first filter is different from the second filter, and
    wherein the first portion of the optical transmission bandwidth is broader than the second portion.

9. The method of claim 8, wherein the first filter is a broadband gain correction filter and wherein the first portion is a majority or all of the optical transmission bandwidth.

10. The method of claim 9, wherein the second filter is a narrow band gain correction filter and wherein the second portion is a narrow region of the optical transmission bandwidth, wherein the first filter and the second filter form a hybrid gain correction filter.

11. The method of claim 10, wherein the hybrid gain correction filter is arranged in a repeater and the broadband and narrow band gain correction filters are gain flattening filters (GFFs).

12. The method of claim 10, wherein the hybrid gain correction filter is arranged in a standalone body and the broadband and narrow band gain correction filters are gain equalization filters (GEFs).

13. The method of claim 8, wherein the first filter is a reflective or non-reflective filter.

14. The method of claim 13, wherein at least one isolator is arranged between the first and second filters if the first filter is the reflective filter.

15. A system comprising:
    at least one repeater arranged and spaced along an optical fiber cable, the at least one repeater comprising a plurality of erbium doped fiber amplifiers (EDFAs) and a plurality of gain correction filters, coupled to the plurality of EDFAs, respectively;

a plurality of hybrid gain correction filters, tailored to correct variations in gain shape generated by the plurality of gain correction filters, each hybrid gain correction filter coupled, via a gain correction filter of the plurality of gain correction filters, to an output of each EDFA of the at least one repeater, and each hybrid gain correction filter comprising:

a first filter; and a second filter different from the first filter, wherein the first filter is configured to correct gain equalization error in a first portion of an optical transmission bandwidth, wherein the second filter is configured to correct gain equalization error in a second portion of the optical transmission bandwidth, and wherein the first portion of the optical transmission bandwidth is broader than the second portion.

16. The system of claim 15, wherein the first filter is a broadband gain correction filter and wherein the first portion is a majority or all of the optical transmission bandwidth.

17. The system of claim 16, wherein the second filter is a narrow band gain correction filter and wherein the second portion is a narrow region of the optical transmission bandwidth.

18. The system of claim 17, wherein the plurality of hybrid gain correction filters are arranged in the at least one repeater and the broadband and narrow band gain correction filters are hybrid gain flattening filters (GFFs).

19. The system of claim 17, wherein the plurality of hybrid gain correction filters are arranged in a standalone body, wherein the standalone body is coupled to the at least one repeater, and the broadband and narrow band gain correction filters are hybrid gain equalization filters (GEFs).

20. The system of claim 15, wherein the first filter is a reflective or non-reflective filter.

* * * * *